(12) United States Patent
Heise et al.

(10) Patent No.: US 7,899,124 B2
(45) Date of Patent: Mar. 1, 2011

(54) METHODS AND SYSTEMS FOR ADAPTIVE COMMUNICATION

(75) Inventors: Bernd Heise, Munich (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 790 days.

(21) Appl. No.: 11/855,215

(22) Filed: Sep. 14, 2007

(65) Prior Publication Data

US 2008/0069248 A1 Mar. 20, 2008

Related U.S. Application Data

(60) Provisional application No. 60/844,833, filed on Sep. 15, 2006.

(51) Int. Cl.
*H04B 1/10* (2006.01)
*H04B 15/00* (2006.01)
*H04L 25/49* (2006.01)

(52) U.S. Cl. .......................... 375/254; 375/285; 375/296

(58) Field of Classification Search .......... 375/220–223, 375/225–227, 316, 340–342, 295, 296, 254, 375/268–269, 278, 285; 370/252; 714/746, 714/751–752, 761, 786
See application file for complete search history.

(56) References Cited

U.S. PATENT DOCUMENTS

| | | | | |
|---|---|---|---|---|
| 5,983,388 | A * | 11/1999 | Friedman et al. | 714/776 |
| 7,519,124 | B2 * | 4/2009 | Oksman et al. | 375/260 |
| 7,630,489 | B2 * | 12/2009 | Oksman et al. | 379/392.01 |
| 7,738,543 | B2 * | 6/2010 | Oksman | 375/222 |
| 2005/0138524 | A1 * | 6/2005 | Cioffi | 714/758 |
| 2007/0248181 | A1 * | 10/2007 | Clausen et al. | 375/285 |
| 2007/0280339 | A1 * | 12/2007 | Oksman | 375/222 |
| 2008/0052609 | A1 * | 2/2008 | Peng et al. | 714/799 |
| 2008/0112472 | A1 * | 5/2008 | Oksman et al. | 375/222 |
| 2008/0165905 | A1 * | 7/2008 | Heise et al. | 375/346 |
| 2008/0232444 | A1 * | 9/2008 | Tzannes | 375/219 |
| 2008/0285510 | A1 * | 11/2008 | Thyagarajan et al. | 370/329 |
| 2010/0054150 | A1 * | 3/2010 | Oksman et al. | 370/252 |

OTHER PUBLICATIONS

Toumpakaris, D., A Simple Byte-Erasure Method For Improved Impulse Immunity In DSL, 2003, Communications, 2003. ICC '03. IEEE International Conference on, vol. 4, pp. 2426-2430.*
Nedev, N., Comparison Between Interleaving and Multiple DMT Symbols Per RS Codeword in ADSL Systems, 2002, Global Telecommunications Conference, 2002. GLOBECOM, '02. IEEE, vol. 3, pp. 2265-2269.*
Asymmetric Digital Subscriber Line Transceivers 2 (ADSL2), Jan. 2005, Series G: Transmission Systems and Media, Digital Systems And Networks, Digital Sections and Digital Line System-Access Networks, ITU-T, pp. 1-436.*
Very High Speed Digital Subscriber Line Transceivers 2 (VDSL2), Feb. 2006, Series G: Transmission Systems and Media, Digital Systems And Networks, Digital Sections and Digital Line System-Access Networks, ITU-T, pp. 1-252.*

* cited by examiner

*Primary Examiner* — Tesfaldet Bocure
*Assistant Examiner* — Lawrence B Williams
(74) *Attorney, Agent, or Firm* — Eschweiler & Associates, LLC

(57) ABSTRACT

One embodiment of the present invention relates to a method of transferring data in a communication system. In the method, an initial impulse noise protection value is determined. A number of redundancy bits is added to blocks of data to form codewords as a function of the initial impulse noise protection value, where the impulse noise protection value corresponds to a number of consecutive symbols that can be corrected. The number of symbols that can be correctly transmitted is changed by changing only the number of redundancy bits added to each block of data.

16 Claims, 11 Drawing Sheets ized form as
a prelude to the more detailed description that is presented
later.

METHODS AND SYSTEMS FOR ADAPTIVE COMMUNICATION

RELATED APPLICATION

This application claims priority to U.S. Provisional Application Ser. No. 60/844,833 filed Sep. 15, 2006, entitled "Methods and Systems for Adaptive Communication."

FIELD OF THE INVENTION

The present invention relates generally to communication methods and systems, and more specifically to adaptive communication service in a communication system.

BACKGROUND OF THE INVENTION

In today's business climate, industry fortunes rise and fall on whether information is exchanged in an efficient manner. Cell phones, pagers, and the Internet have thrived because each technology allows businesses to exchange critical market information at a moment's notice. In addition, such technologies allow individuals to keep abreast of recent developments with family and friends. In short, many segments of our modern society require instant access to accurate, up-to-the-minute information.

Companies spend significant resources to develop modern communication systems that provide people with such information. As networked communication systems have matured, data rates have increased from 20 kilobits per second (kb/s) in 1975, to 100 Mb/s with modern VDSL. In other words, customers in today's "information age" can receive data approximately 5,000 times as fast as network customers of thirty years ago. To bring customers into this modern "information age", developers have spent billions of dollars to develop network technologies such as Digital Subscriber Line (DSL) technology, for example. To continue to increase data rates at such a remarkable pace, communication systems developers will likely be required to spend significant capital resources for many years to come.

The data rate at which data is successfully transferred over a communication system generally decreases as the noise increases. Thus, communication systems strive to minimize the effects of various types of noise, such as continuous noise, impulse noise, or combinations thereof. For example, continuous noise (stationary noise) can have randomly distributed values of noise over time, whereas impulse noise (non-stationary noise) generally comprises short bursts of relatively high levels of noise that affect a relatively narrow frequency. In any event, communication systems employ various mechanisms or techniques to combat continuous and impulse noise and/or to correct noise-related data transfer errors.

While the existing methods and systems for combating noise and for correcting noise-related data transfer errors are sufficient for their stated purpose, the methods and systems are not sufficient to accurately account for changes in impulse noise during communication service. Thus, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method of transferring data in a communication system. In the method, an initial impulse noise protection value is determined. A number of redundancy bits is added to blocks of data to form codewords as a function of the initial impulse noise protection value, where the impulse noise protection value corresponds to a number of consecutive symbols that can be corrected. The number of symbols that can be correctly transmitted is changed by changing only the number of redundancy bits added to each block of data. Other embodiments are also disclosed.

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1:
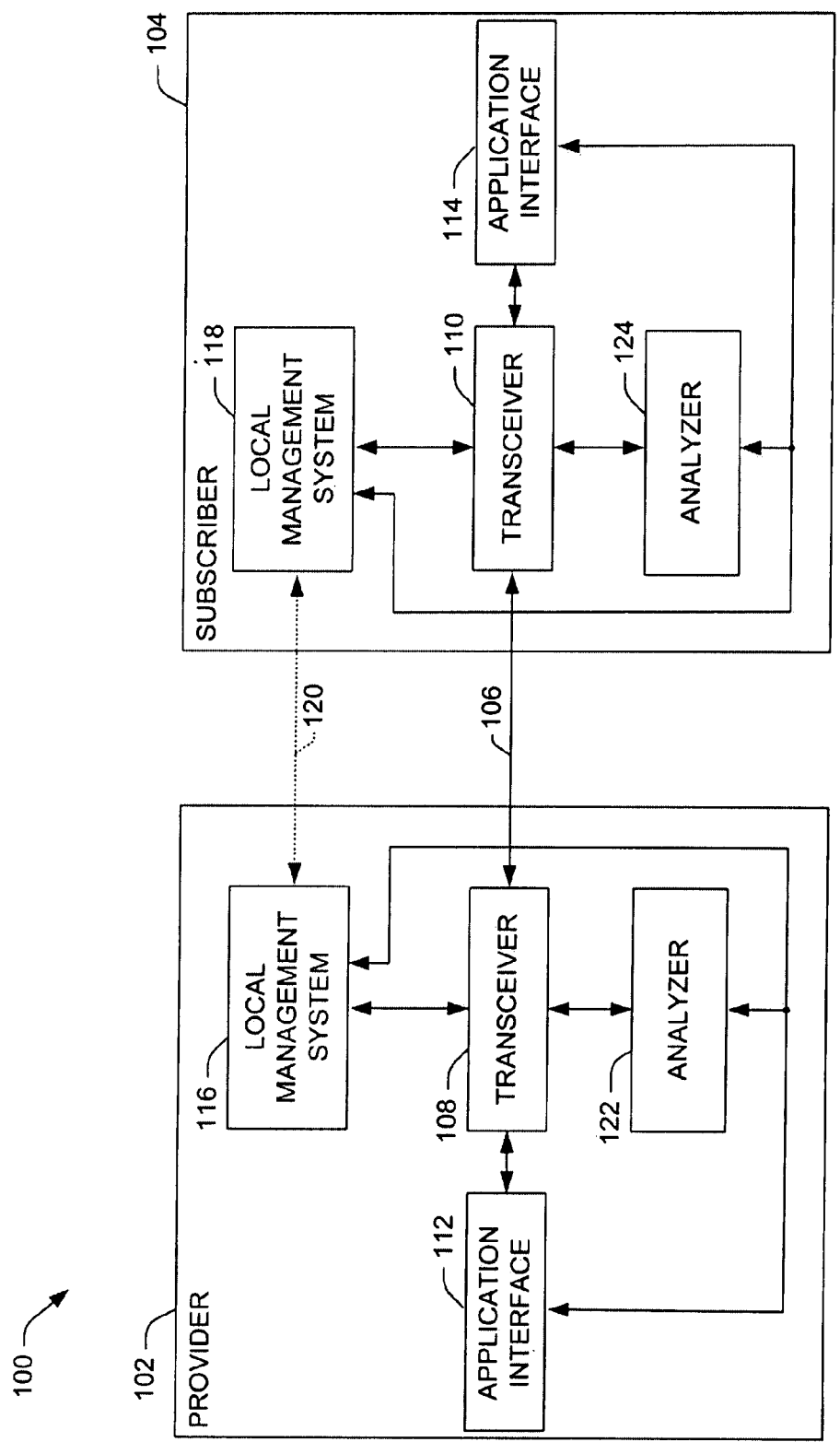
FIG. 1 is a block diagram of one DSL communication system.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

FIG. 1 illustrates one communication system 100 in which one or more aspects of the invention may be implemented, comprising first and second modems 102 and 104, respectively, coupled to a transmission line 106, wherein data is transferred between the modems 102 and 104 over the transmission line 106. The invention may be employed in communications systems using any type of transmission line by which data can be transferred between modems or other endpoints of a communication system. For example, illustrative transmission lines could include, but are not limited to: wire transmission lines (e.g., twisted pair of copper wires), cable transmission lines (e.g., coax cable), optical transmission lines (e.g., a strand of glass fiber), and wireless transmission lines (e.g., the atmosphere), any of which could support single or multi-carrier communication.

In one embodiment, the modems 102 and 104 are DSL modems having suitable circuitry for providing DSL communication service over a twisted copper pair generally in accordance with ANSI T1.413 (ADSL), T1.424 (VDSL), G.993.2

(VDSL2) and other DSL standards, including the performance of the tasks and functions described herein. For example, in the illustrated communication system 100, the first modem 102 may be a provider modem that is located at a DSL service provider premises (e.g., CO), while the second modem 104 may be a subscriber modem that is located, for example, in a residential home that receives DSL service (e.g., CPE).

In one embodiment, one or both of the modems 102 and/or 104 are adapted to monitor impulse noise with respect to data received on the transmission line 106 from the other modem during communication service. The modems can analyze the monitored impulse noise and selectively propose appropriate noise protection parameter changes to the other modem. Further, the modems are adapted to cooperatively adjust impulse noise protection as they transfer data on the line 106 (e.g., by selectively adjusting Forward Error Correction (FEC) and interleaver (IL) parameters) according to the observed impulse noise.

The exemplary first modem 102 comprises a transceiver 108 that is coupleable to the line 106 and operates to support communication service (e.g., DSL service) with the second modem 104, specifically a transceiver 110 thereof. The first modem 102 also comprises an application interface 112 to a host system, wherein the second modem 104 also comprises an application interface 114 with a network node (not shown), such as a service subscriber's home computer, for example.

In one embodiment, each modem 102 and 104 can also include a local management system 116 and 118, respectively, which provides communication parameters and control signals to facilitate communication between the modems 102 and 104. In other non-illustrated embodiments, for example, the management system could be centralized or distributed. For example, each local management system can provide sub-carrier bit allocations, gain settings, forward-error-correction (FEC) parameters, interleaver (IL) parameters, and modulation parameters for communicating data to and from the line. The local management systems 116 and 118 of the first and second modems 102 and 104, respectively, exchange FEC, IL, modulation, and other control parameters to provide matching settings of these parameters in both modems (e.g., FEC parameters of FEC encoder will match the FEC parameters of the FEC decoder, and so on). Control information and communication parameters are exchanged between the two modems via a management channel 120, arranged over one or more of the sub-carriers of the line 106, or as an embedded overhead data channel, using any suitable communication or data exchange protocol, so as to coordinate parameters settings, rate adjustments, timing of changes, etc. Each local management system 116, 118 can be configured to adaptively alter the impulse noise protection parameters.

The modems 102 and 104 also include analyzers 122 and 124, respectively, that can monitor impulse noise on the line 106 and selectively recommend changes in the impulse noise protection to the associated local management system 116, 118, respectively. After receiving such a recommendation, the management system, in turn cooperatively interacts with the corresponding management system of the other modem to coordinate synchronized implementation of such changes of impulse noise protection parameters in the system 100 without interrupting the communication service. The management system, in turn, prompts the other modem to provide time markers for FEC and bit distribution changes to coordinate changes in the settings of both modems without interrupting communication service.

The analyzers 122 and 124 analyze received data error information and suitable statistics based thereon. If an analyzer determines the current impulse noise protection is ineffectual based on the current impulse noise situation (e.g., uncorrected errors due to impulse noise), the analyzer can recommend increasing impulse noise protection. Conversely, if the current impulse noise protection is deemed to be excessive for the current impulse noise situation, the analyzer may recommend decreasing impulse noise protection to increase efficiency of the system.

Figure 2:
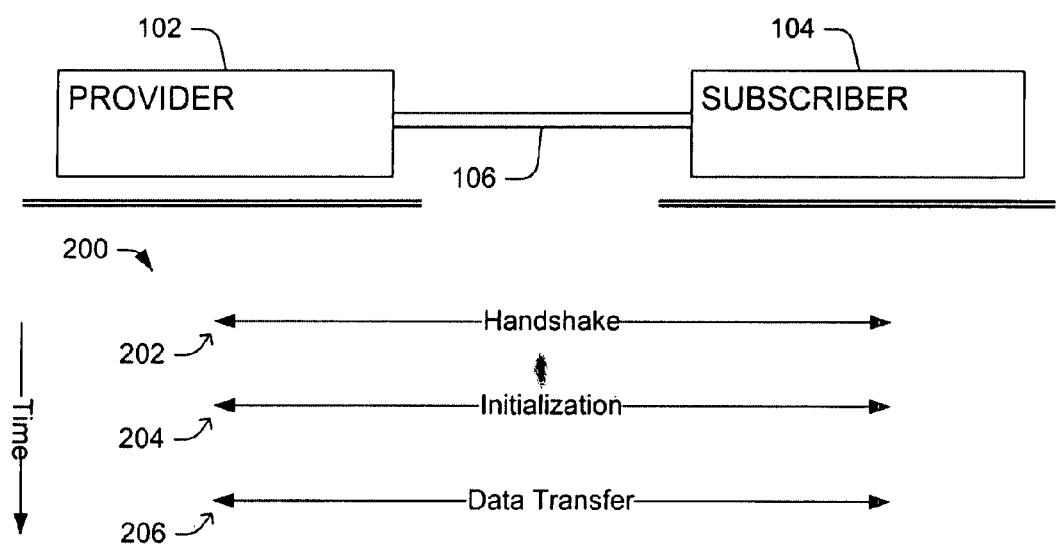
FIG. 2 illustrates one communication protocol for establishing communication service.

In order to carry out the appropriate noise protection parameter changes, the modems 102 and 104 may undergo a variety of procedures to establish a communication service, in which user data is transferred over the line 106 between the modems 102 and 104. FIG. 2 shows one such communication protocol 200, wherein horizontal lines can indicate stages of communication or messages exchanged between the modems. The illustrated communication protocol 200 includes several steps, which are further described below, namely: handshake 202, initialization 204, and data transfer 206, wherein the modems 102 and 104 can set initial impulse noise parameters prior to data transfer (e.g., during handshake 202 or initialization 204), and then adjust the impulse noise parameters during data transfer 206 without interrupting the communication service. In various embodiments (e.g., embodiments described in FIG. 4 and FIGS. 5A-5E), the impulse noise protection parameters are initially set in an advantageous manner that allows the parameters to be adjusted so as to minimize variation in a transmission characteristic of the system (e.g., transmission delay).

During data transfer 206 (which may also be referred to as "showtime"), modems 102 and 104 transfer user data, wherein care is taken to provide error-limited or error-free data to the user. For example, Forward Error Correction (FEC) and interleaving are two processes used to combat noise during data transfer 206. In various embodiments, the present invention relates to systems and methods that provide for an optimal setting of an FEC encoder and interleaver that will provide greater noise protection against impulse noise, including impulse noise consisting of randomly distributed short impulses. Further, other aspects of the invention relate to how to derive initial FEC and IL parameters without knowledge of the impulse noise characteristics on the line, and how to seamlessly adjust the modems to operate with new FEC and IL parameters which account for impulse noise on the line.

To provide some context for FEC and interleaving, Table 1 below lists several parameters involved in FEC and interleaving in accordance with the present invention. These parameters are discussed below with reference to FIGS. 3A-3I, which illustrate one embodiment that uses FEC and interleaving to limit the effects of impulse noise in DSL communication service. Further, FIGS. 4 and 5A-5E describe methods 400 and 500, respectively, in which the FEC and interleaving parameters are initially set and then dynamically adjusted so as to minimize a variation in a transmission characteristic of the system. In one embodiment, the FEC and interleaving parameters are adjusted to minimize the variation in transportation delay.

TABLE 1

Parameters of an FEC/interleaver and their relations

| Parameter | Description | Value | (1) |
|---|---|---|---|
| Fs | Average Symbol rate (without Synch-symbols) | For VDSL/ADSL: 4 or 8 kHz | (2) |
| Ts | Symbol duration (incl. pro-rata Synch-symbols) | For VDSL/ADSL: 250 or 125 μsec | (3) |
| L | Number of bits loaded per Symbol | | (4) |
| Lbr | Line bit rate | lbr = fs × L = L/Ts | (5) |
| I | Interleaver block length in bytes | I is integer | (6) |
| D | Interleaver depth in bytes | D is co-prime with I | (7) |
| Q | Number of Interleaver blocks per codeword | Q = integer | (8) |
| N | Code word length in bytes | N = Q × I | (9) |
| R | Min. Number of redundant bytes per codeword | R | (10) |
| $t_C$ | Number of correctable bytes per code word | $R/2 \leq t_C \leq R$ depending on the FEC method NOTE: If the location of the errored bytes is random, $t_C = R/2$ and can get up to R if the location of errored bytes is known on some extend. In DSL standards tc = R/2 without erasure decoding used and is close to R with erasure decoding used) | (11) |
| $t_B$ | Effective Number of correctable bytes per interleaver block | $t_B = \lfloor t_C/Q \rfloor$; | (12) |
| $t_{max}$ | Max. number of correctable bytes per codeword | $t_{max}$ | (13) |
| DE | Span of Erasure-correction in bytes | DE = D × ⌊$t_C$/Q⌋ = D × $t_B$ | (14) |
| INP | Impulse Noise Protection Parameter (Equal to the number of completely erased subsequent Symbols the system can cope with no errors) | INP = ⌊DE × 8/L⌋ = ⌊D × $t_B$ × 8/L⌋ | (15) |
| DL | Interleaver delay in bytes (End-to-End) | (D − 1) × (I − 1) | (16) |
| TL | Interleaver delay in seconds (End-to-End) | (D − 1) × (I − 1) × 8/lbr | (17) |
| $C_B$ | Span of the interleaver block in bytes | (D − 1) × (I − 1) +/= D × (I − 1) + 1 | (18) |
| $C_C$ | Span of the codeword in bytes | (D − 1) × (I − 1) + N | (19) |
| SL | Interleaver delay in Symbols | | (20) |

In setting up the communication service, the modems may agree on a maximum number of correctable bytes per codeword, $t_{max}$, which may be determined by the specific modem design or by settings provided by the management system. In various systems, there may be an upper limit for $t_{max}$, given by the FEC method utilized.

Figure 3A:
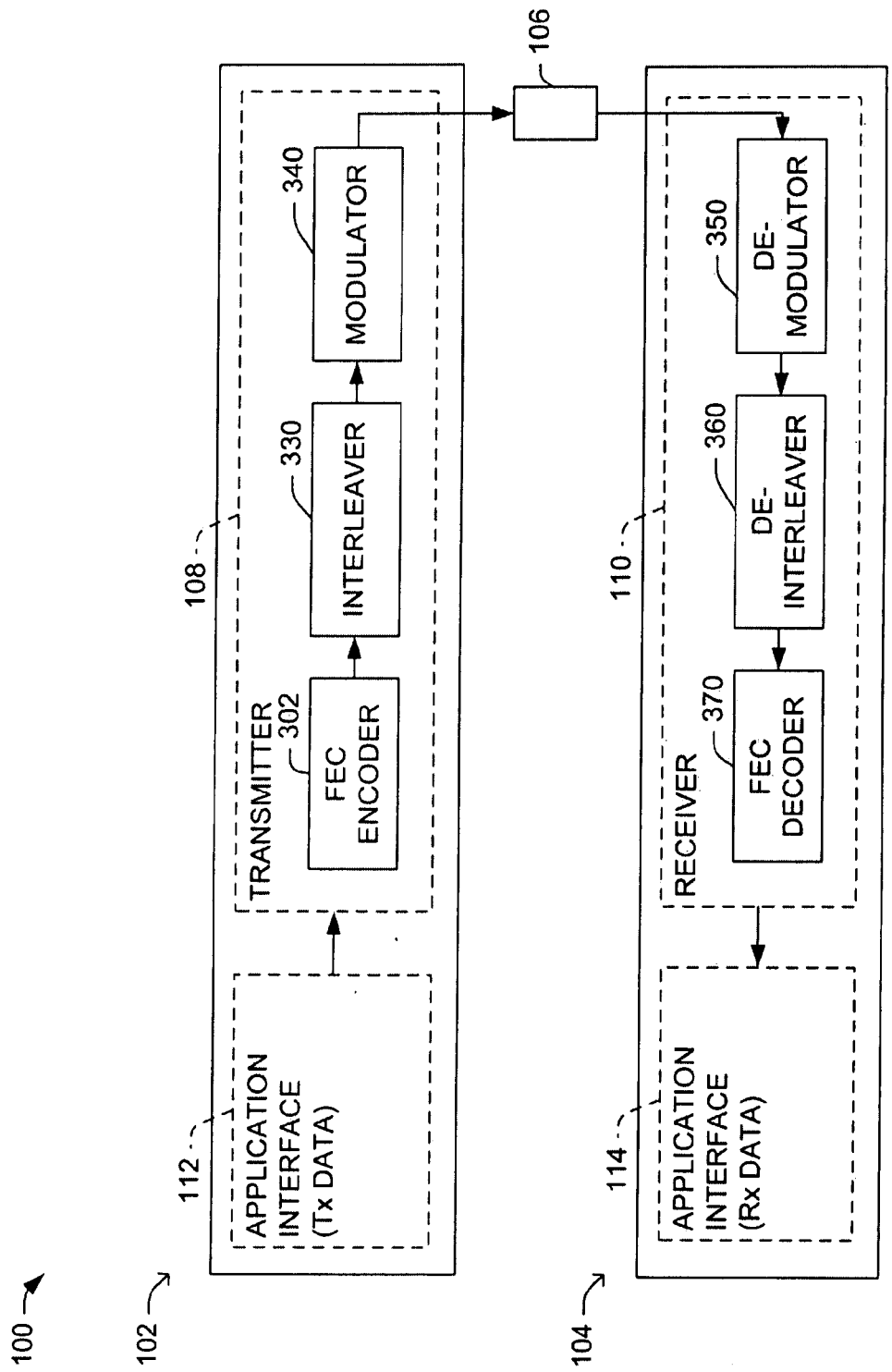
FIGS. 3A-3I illustrate one embodiment of data processing in a DSL communication system.

Referring now to FIG. 3A-3I, one embodiment of utilizing FEC and interleaving in a DSL system 100 is now discussed. In FIG. 3A, data is shown as being transmitted from a provider modem 102 to a subscriber modem 104, wherein the subscriber modem 104 receives the data, and wherein both modems 102 and 104 utilize agreed on communication parameters (e.g., IL parameters, FEC parameters, etc.). For purposes of simplicity, data is shown as being transmitted only from the provider modem 102 to the subscriber modem 104, although it will be appreciated that in typical implementations both modems 102 and 104 are capable of transmitting and receiving data in the manner described. In this regard, the exemplary communication system 100 is symmetrical, although the various aspects of the invention may be carried out in other systems in which data is transferred in a single direction only.

Figure 3B:
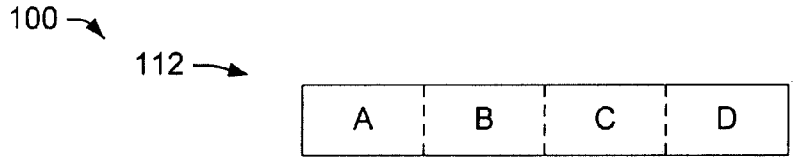

As shown in FIG. 3A, application data is provided at the application interface 112 of the first modem 102 as a number of blocks of data (e.g., message "ABCD" in FIG. 3B).

Figure 3C:
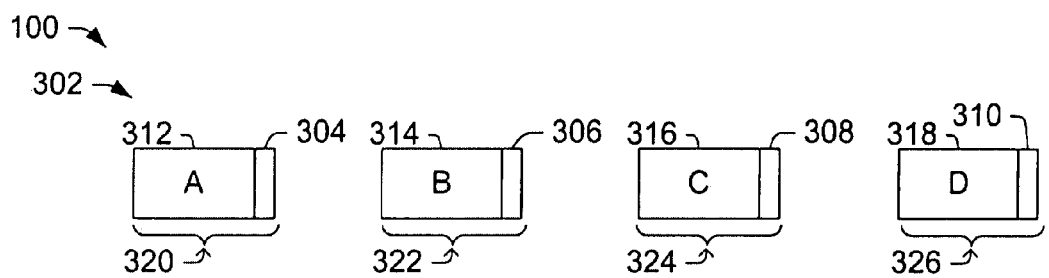

An FEC encoder 302 generates a certain number of redundancy bytes or bits for each block of data. As shown in FIG. 3C, the FEC encoder adds redundancy bytes (304, 306, 308, 310) to each block of data (312, 314, 316, 318, respectively) to form an FEC codeword (320, 322, 324, 326, respectively), wherein each codeword has a codeword length N that is an integer number of bytes. The number of redundancy bytes must be greater than or equal to the minimum number of redundancy bytes, R. In addition, a number of correctable bytes per codeword, $t_c$, is related to the number of redundancy bytes, wherein $t_c$ is generally less than or equal to R, or greater than or equal to R/2, depending on the FEC method utilized.

Referring back to FIG. 3A, after the FEC encoder 302 adds the redundancy bytes, an interleaver 330 mixes (interleaves) data from the FEC codewords in a manner that limits the effects of impulse noise. The interleaver 330 includes buffer memory, wherein the size (in bytes) of the buffer memory may also be referred to interleaver depth, D.

Figure 3D:
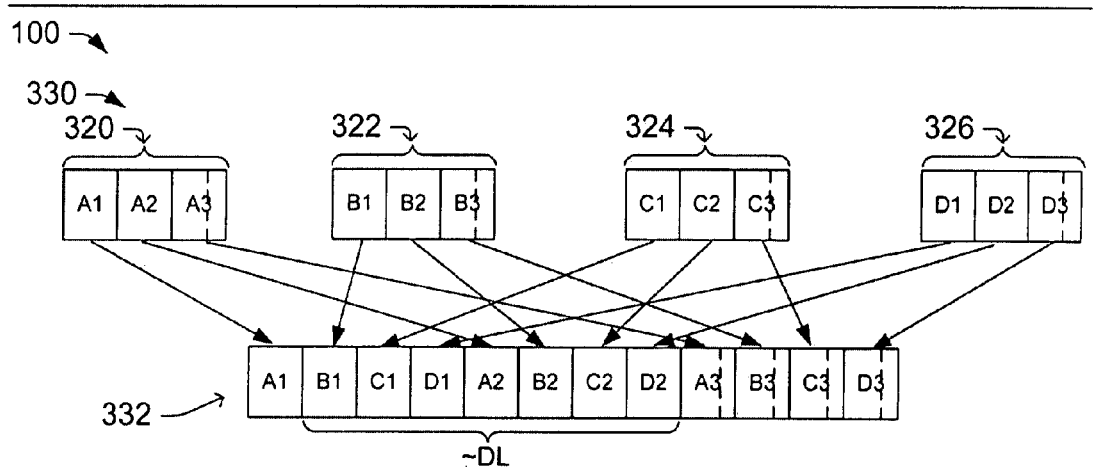

As FIG. 3D shows, the interleaver 330 divides each codeword into interleaver blocks or segments, wherein each segment may have an integer byte length, 1. Typically, the number of interleaver blocks per codeword, Q, is an integer. For example, in the illustrated embodiment, Q=3 because there are three interleaver blocks (e.g., A1, A2, and A3) per codeword (e.g., 320); although Q may be other integers in other embodiments.

The algorithm for segment mixing is intended to place segments belonging to the same FEC codeword (e.g., A1, A2, and A3 belong to codeword 320) remotely from each other in the interleaved data stream 332. Thus, during transmission, adjacent segments of one FEC codeword (e.g., A1 and A2; or A2 and A3) are separated by a time period that is associated with the interleaver depth (not shown), while all interleaver blocks of one FEC codeword (e.g., A1 and A2 and A3) are spread over a time period associated with the latency introduced by the interleaver (also referred to as interleaver delay, DL). Although FIG. 3D shows one straightforward algorithm with which interleaver blocks could be mixed, the present invention includes countless others. For example, typical DSL modems will support convolutional interleaving, although they may support others in addition to or in substitution thereof.

Because impulse noise is relatively infrequent and corrupts individual symbols or groups of consecutive symbols in the interleaved data stream 332 during a short period of time, interleaving can effectively "even" the load of error-correcting work among several FEC codewords by distributing the errors caused by a single impulse noise burst over the several FEC codewords. For example, if an impulse burst corrupted consecutive symbols spanning segments A1 and B1 of the interleaved data stream 332, the error correcting work could be spread over codewords 320 and 322; thus redundancy bytes 304 and 306 could allow the system to correct the corrupted data.

After the interleaver 330 processes the data, the system 100 divides the interleaved data stream 332 into so-called data frames 334, wherein each data frame contains a number of bits of interleaved data that could be loaded onto a symbol, for example, via a one-to-one mapping, wherein each symbol is an N-dimensional (possibly complex) vector.

In one embodiment, the symbols are framed in a manner such that a first integer number of symbols corresponds to a second integer number of bytes of an interleaver block or FEC codeword, wherein the first and second integers may be equal or unequal. By framing the symbols in this manner, the impulse noise protection (INP) value (which corresponds to a number of consecutive symbols that can be corrected), can be adjusted solely by changing the number of redundancy bits associated with each block. Previously, reconfiguring the INP value "on the fly" required complex processing and/or hardware due to the fact that adjusting the INP value has heretofore been achieved by changing the interleaving depth. Thus, by allowing the INP value to change as a function of the redundancy bits (without necessarily changing the interleaver depth) the present invention makes it easier to seamlessly adapt the INP value during a communication session.

Figure 3E:
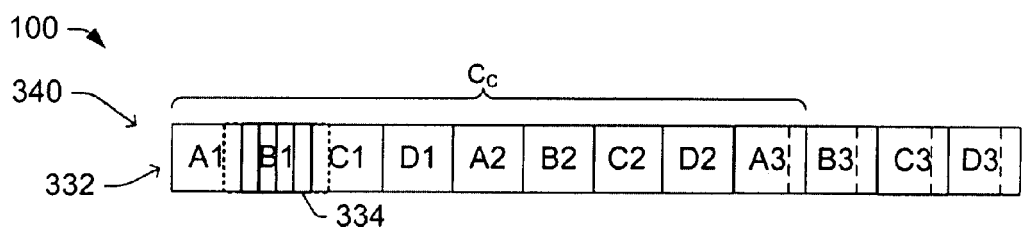

For example, in the illustrated embodiment of FIG. 3E, interleaver block B1 could comprise one byte of data, which could be loaded onto one symbol. Thus, the first and second integers could be equal. In another example, the interleaver block B1 could comprise four bytes of data, all of which could be loaded onto one symbol. Thus, the first and second integers could also be unequal. In various embodiments, the bytes of the interleaver block can be equally distributed over the symbols when the interleaver depth, D, is only a little greater than an integer fraction Q of L/8. Thus, Q bytes of an interleaver block can be placed into consecutive symbols, and a byte boundary of an interleaver block or codeword can be aligned to a boundary of the symbol.

Further, the manner in which codeword bytes are distributed over symbols can be characterized by a protection-to-correction ratio (PC), wherein PC can be defined as $INP_{max}/t_{max}$. In one embodiment, the system 100 may set PC=1, such that the interleaver depth, D, is only a little greater than L/8, which corresponds to the number of bytes in a symbol. In such embodiments, the interleaver stretches the bytes within an interleaver block such that the bytes are placed one by one into consecutive symbols. In other embodiments, the system may set PC>1, wherein the depth of the interleaver, D, is selected such that some symbols in the span of the interleaver block don't contain bytes of the interleaver block. In still other embodiments, the system can set PC<1, wherein the depth of the interleaver, D, is selected such that some symbols in the span of the interleaver include more than one byte of the interleaver block.

After the data stream is encoded and the symbols are properly framed, the modulator 340 then modulates the outgoing sub-carrier constellations (e.g., using inverse discrete Fourier transform (IDFT)) onto the sub-carriers according to the set bit distribution, and provides the modulated (analog) signals to the line 106 according to sub-carrier power settings. The process by which data is loaded onto the sub-carriers may also be referred to as bit loading.

After the modulated signals traverse the line 106, the modulated signals are received at the second modem 104, specifically the demodulator 350 thereof, which includes suitable analog circuits for interfacing with the line 106. The demodulator 350 of the second modem 104 demodulates the received signals into individual sub-carrier constellations (e.g., using discrete Fourier transform (DFT)), and decodes the received constellations according to the bit distribution parameters (e.g., framing parameters) agreed upon during the initialization.

Figure 3F:
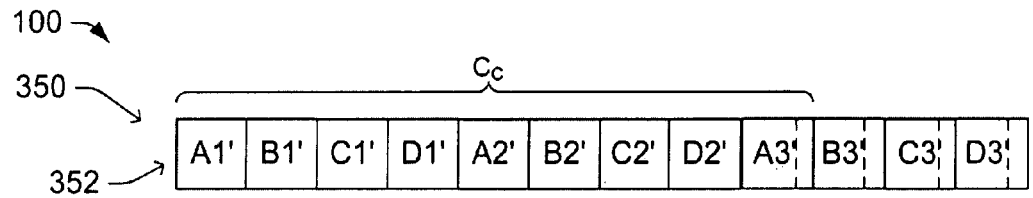

As shown in FIG. 3F, depending on whether noise alters the data transmitted on the line 106, the data of the received data stream 352 (e.g., A1', B1', C1', . . . ) may or may not be equal to the data of the transmitted data stream 332 (e.g., A1, B1, C1, . . . respectively). In one embodiment, to characterize the noise on the line, the modems can determine a number of corrupted symbols by analyzing the number of consecutively corrupted symbols within the codeword span $C_c$, or other suitable span.

Figure 3G:
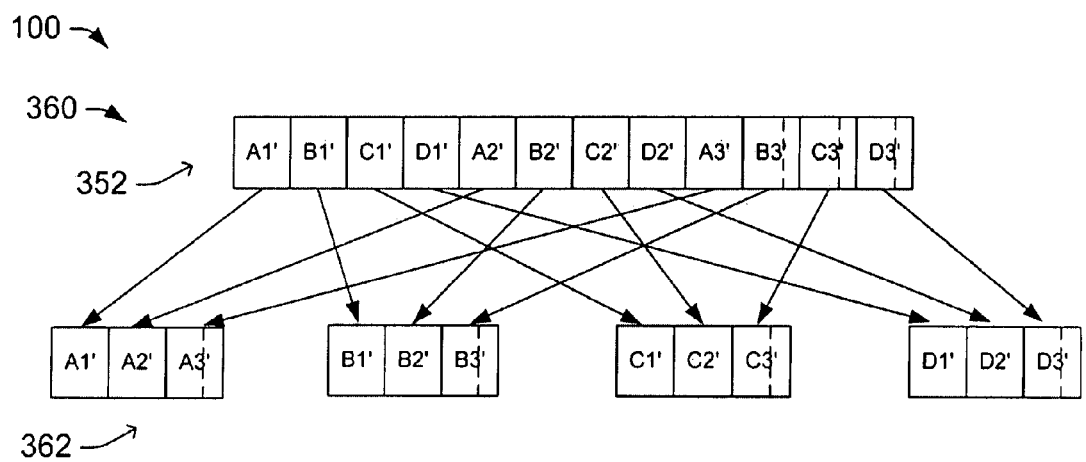

After the demodulator 350 receives the received data stream 352, the deinterleaver 360 un-mixes (de-interleaves) the received data stream. As shown in FIG. 3G, the received data stream 352 is deinterleaved to retrieve a stream of received segments 362, which includes one or more segments or deinterleaved blocks (e.g., A1'). Although FIG. 3G shows one straightforward algorithm with which the received data stream 352 could be de-interleaved to retrieve the received segments 362, the invention includes countless others (e.g., inverted interleaver algorithms) and such variations are contemplated as falling within the scope of the invention.

Figure 3H:
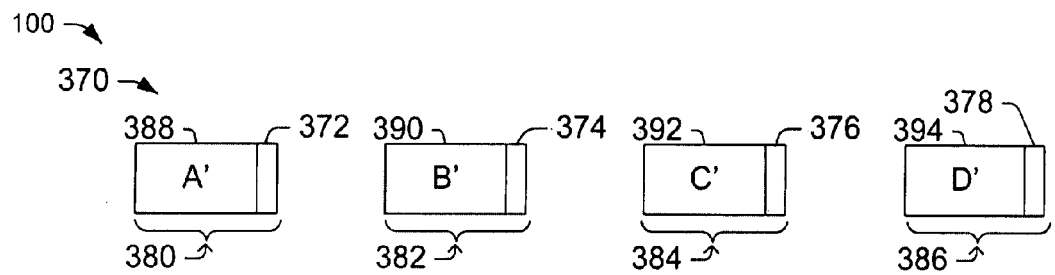

After the deinterleaver 360 reassembles the data, as shown in FIG. 3H the FEC decoder 370 uses the redundancy bytes (372, 374, 376, 378) of each received FEC codeword (380, 382, 384, 386, respectively) for recovering or correcting a certain number of corrupted data bytes from each corresponding block of data (388, 390, 392, 394, respectively). Thus, the FEC decoder 370 ensures that when a small number of bytes in a received codeword are corrupted, the original data transmitted in the codeword (e.g., A, B, C, D) can be recovered from the data in the received codeword (e.g., A', B', C', D'). Thus, increasing FEC redundancy (e.g., the number of redundancy bits) adds further FEC protection against impulse noise while effectively decreasing the data rate, and vice versa, wherein the goals of impulse noise protection and effective data rate involve a tradeoff.

Figure 3I:
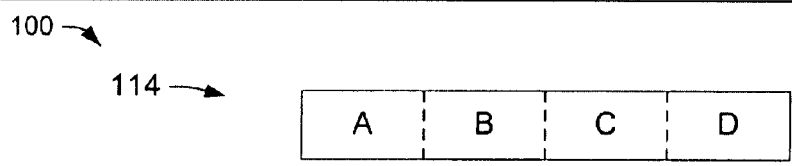

After the FEC codewords are processed by FEC decoder 370, the resulting data can be reassembled at the application interface 114 (e.g., message "ABCD") as shown in FIG. 3I. This resulting data can, for example, be utilized for a user's benefit.

Although the communication system 100 and several of its components has been described above, it will be appreciated that the present invention includes countless other variations that are contemplated as falling within the scope of the invention. For example, to further facilitate accurate data transmission, the communication system could also include a scrambler (e.g., positioned between the application interface 112 and the FEC encoder 302) and descrambler (e.g., positioned between the FEC decoder 370 and the application interface 114). Other variations are could also be included.

Figure 4:
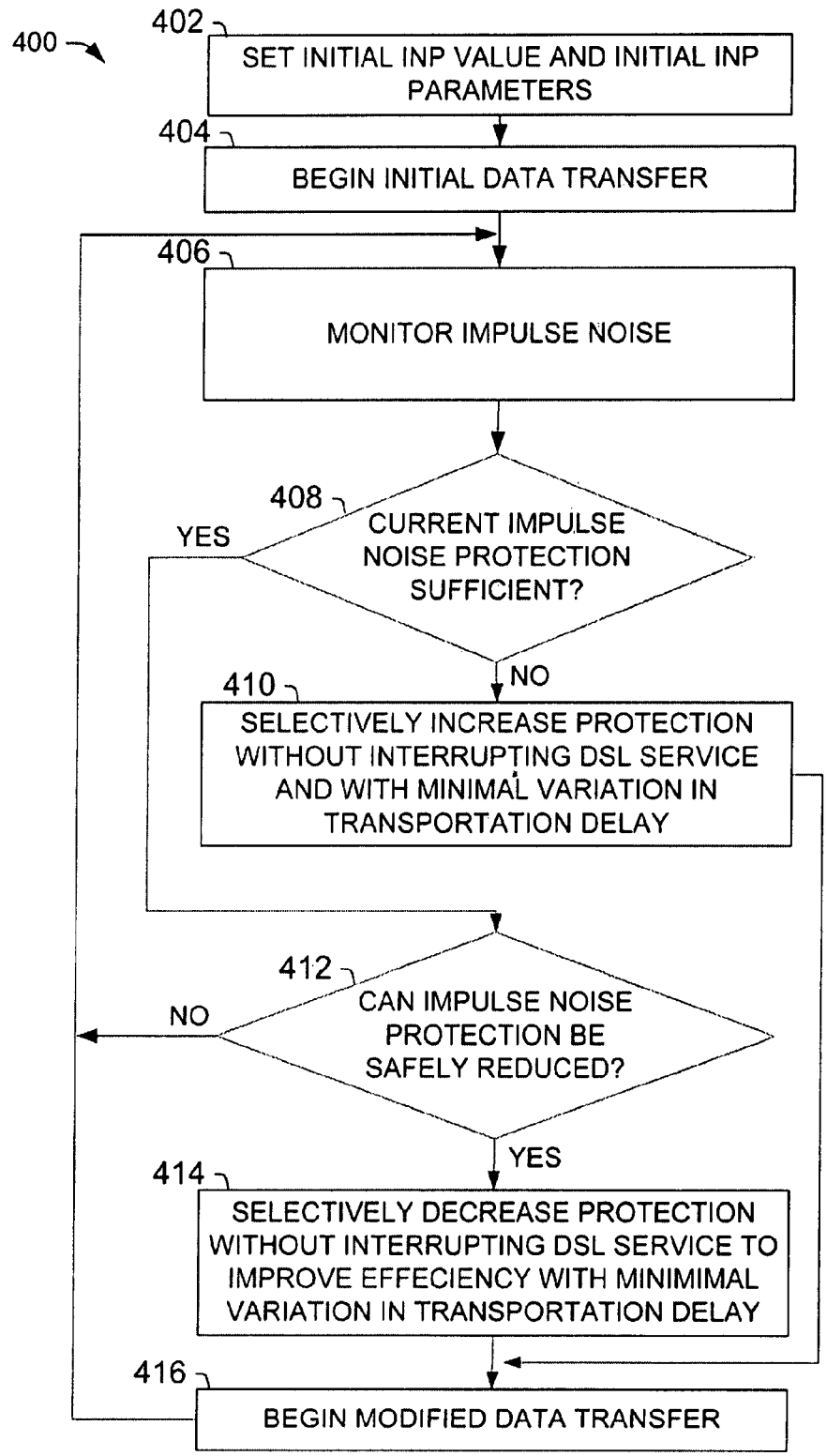
FIG. 4 is one embodiment for selectively implementing changes in impulse noise protection.

As one embodiment of FEC and interleaving has now been discussed with regard to various parameters in FIGS. 3A-3I, reference is now made to FIG. 4 and FIGS. 5A-5E, which illustrate exemplary methods for selective adjustment of impulse noise protection parameters (e.g., FEC and IL parameters) in a communication system in accordance with the present invention. FIG. 4 illustrates a simplified method 400 and FIGS. 5A-5E illustrate a more detailed method 500. In this regard, the various components of the communication system and other systems of the invention include suitable circuitry, state machines, firmware, software, logic, etc. to perform the various methods and functions illustrated and described herein, including but not limited to the exemplary methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 100 in FIG. 1) as well as in association with other systems not illustrated, wherein all such implementations are contemplated as falling within the scope of the present invention and the appended claims.

In various embodiments, FEC and IL parameters are set during initialization in a manner that provides equal distribution of codeword bytes over DMT symbols. This equal distribution has several advantages. For example, it facilitates the monitoring process (e.g., monitoring impulse noise) because each corrupted symbol can lead to Q corrupted bytes in a codeword. In addition, changing INP is facilitated because increasing tB by one increases INP by one, because decreasing tB by one decreases INP by one and vice versa. Thus, the FEC and IL parameters can be optimized by minimizing the number of redundant bytes R while providing sufficient latency and impulse noise protection. Thus, the system can minimize the number of correctable bytes that are needed to protect the system and still provide adequate impulse noise protection.

In the method 400 of FIG. 4, an initial INP value as well as initial FEC and IL parameters are set at 402 prior to data transfer, wherein the FEC and IL parameters can be set without knowledge of the dynamic characteristics of the impulse noise on the line.

In step 404 initial data transfer begins and impulse noise is monitored at 406 during data transfer. It is noted at this point that in the illustrated embodiment, the impulse noise monitoring, analysis, and selective protection parameter adjustment features of the invention are undertaken after the start of data transfer. However, the techniques of the present invention may be employed alone or in combination with pre-data transfer parameter adjustments or initialization routines.

In 406, the impulse noise may be monitored during data transfer by accumulating statistics of data transfer errors and analyzing such statistics with respect to the existence of errors due to impulse noise (e.g., in analyzer system 122 or 124 of FIG. 1), including whether and how many such errors have occurred in the line 106 and how many of these are corrected and/or uncorrected by the current FEC redundancy settings. Other suitable monitoring and analysis techniques may be employed at 406 by which the existence and severity of channel impulse noise is ascertained, wherein all such variant implementations are contemplated as falling within the scope of the invention and the appended claims.

At 408-416, the impulse noise protection is selectively adjusted or adapted according to the monitored impulse noise in the channel without interrupting the communication service. At 408, a determination is made as to whether the current impulse noise protection is adequate or sufficient, based on the monitored impulse noise. If not (NO at 408), the impulse noise protection is selectively increased at 410 without interrupting the DSL service, and the method 400 starts modified data transfer at 416 and returns to 406 to continue impulse noise monitoring. In various embodiments it is acceptable that change of FEC parameters is implemented by re-initializing or re-starting the system. In the detailed examples illustrated and described below with respect to FIGS. 5A-5E, the number of correctable bytes per interleaver block is adjusted to change the impulse noise protection. However, any single operational parameter or multiple operational parameters of a communication system may be adjusted at 410 by which protection against impulse noise is increased, wherein all such alternative implementations are contemplated as falling within the scope of the invention and the appended claims. In this regard, the method 400 and other methods of the invention facilitate adaptive adjustment without service interruption to accommodate situations where channel impulse noise worsens or improves after DSL service has begun. Thus, even where the parameters are initially tuned or selected without knowledge of the dynamic noise environment, the present invention advantageously provides dynamic adjustment to facilitate optimal tradeoff between current noise conditions that change from time to time and system efficiency to an extent not possible using prior techniques.

If the current impulse noise protection is sufficient (YES at 408), a determination is made at 412 as to whether the impulse noise protection can be safely reduced. If so (YES at 412), the impulse noise protection is selectively decreased at 414 without service interruption, and the method 400 begins modified data transfer with the new parameters at 416 and returns to 406 to continue impulse noise monitoring. In the exemplary implementations illustrated and described below with respect to FIGS. 5A-5E, interleaving levels are decreased, FEC redundancy is decreased, and/or codeword size is increased to reduce the impulse noise protection. However, any single or multiple operational parameters of a communication system may be adjusted at 414 by which excess protection against impulse noise is reduced, wherein all such alternative implementations are contemplated as falling within the scope of the invention and the appended claims. In this manner, the method 400 facilitates improvement in system efficiency (e.g., increased data rate by decreased impulse noise protection) in situations where the channel impulse noise decreases. If the impulse noise protection cannot be safely reduced, (NO at 412), the method returns to monitor impulse noise at 406 without adjusting the impulse noise protection settings.

Referring now to FIGS. 5A-5E, another more detailed method 500 is shown. In step 502, prior to initialization, the operator sets the maximum interleaver delay for the system, which is determined by the services to be used.

In step 503, which can be carried out prior to data transfer (e.g., during initialization 204 in FIG. 2), the system sets a current INP value to an initial INP value, and also sets the maximum value of required INP, both expressed as a number of DMT symbols potentially erased by the impulse noise during the span of an FEC codeword. The maximum value of INP is the maximum number of corrupted symbols that the modem is able to correct. The initial value of INP is set in each transmission direction and may be either an expected (typical) value set by the operator, or a default value assigned by the DSL modem, or a result of analysis of the impulse noise on the line 106 during initialization. The latter can be productive when repetitive impulse noise (REIN) or random impulse noise with short inter-arrival time is the case, however it may be less useful for isolated impulse noise events due to short initialization time.

In 504, Based on maximum interleaver delay, and the initial INP value, and the maximum INP value, modem 102 calculates the initial optimum FEC and IL parameters and communicates them to modem 104 via the management channel 120. Because these initial parameters are based on impulse noise during a limited time (e.g., during initialization), the initial optimized FEC and IL settings may not capture the real-time (dynamic) characteristics of impulse noise over the line. In particularly advantageous embodiments, FEC and IL parameters are set in a manner that provides equal distribution of codeword bytes over DMT symbols. Further, in various embodiments (e.g., one embodiment in FIGS. 5B-5D discussed further below) the optimized FEC and IL settings may be calculated based on a value related a communication characteristic, such as the protection-to-correction ratio (PC), for example.

Figure 5A:
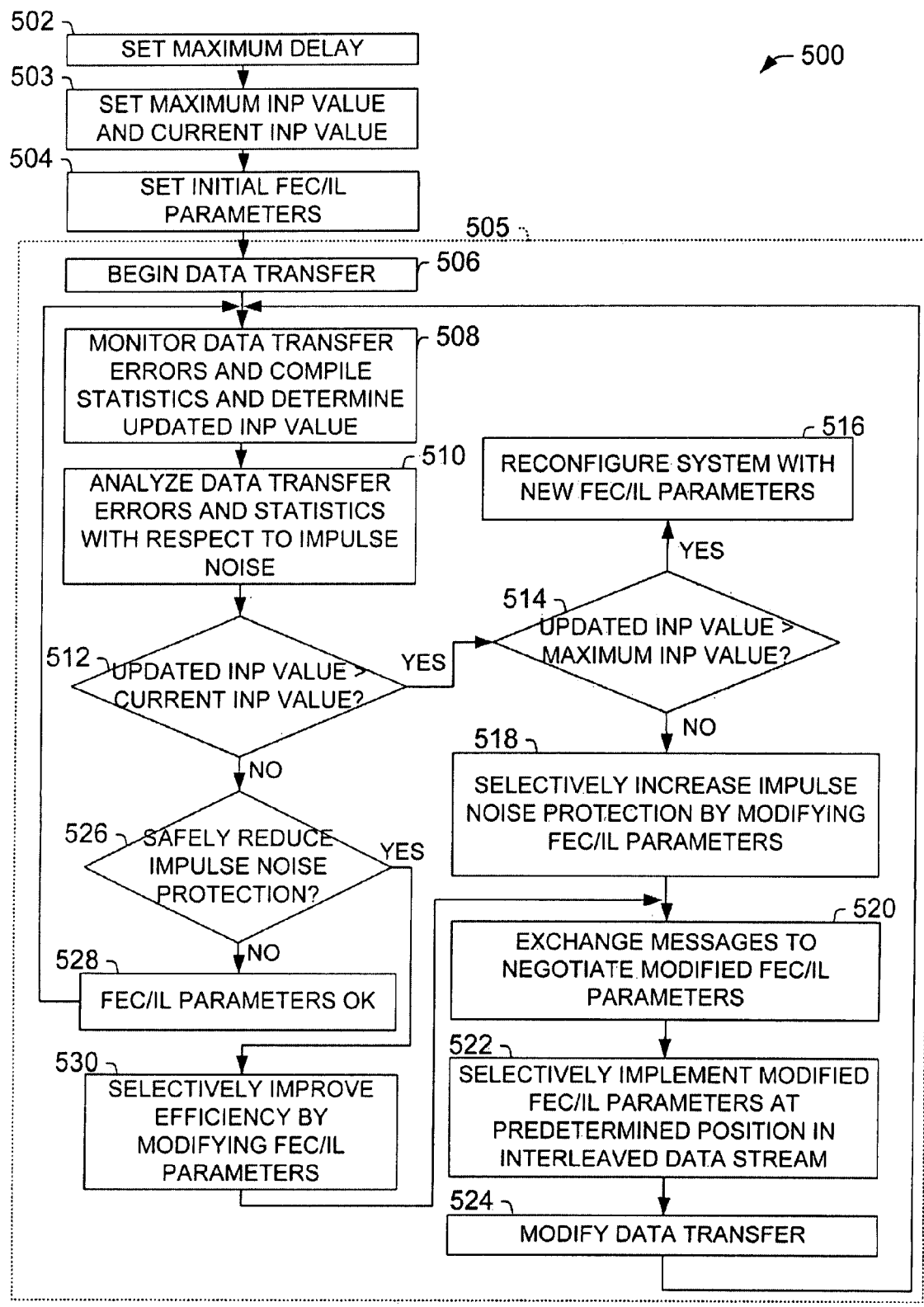
FIGS. 5A-5E is a more detailed embodiment for selectively implementing changes in impulse noise protection.

Still referring to FIG. 5A, in 505 the modems 102 and 104 transition into the data transfer state (506) and selectively alter the FEC and IL settings to account for dynamic changes in the impulse noise in the system.

More specifically, in steps 508-510, the monitoring process starts. In various embodiments, the monitoring process includes receiving a group of consecutive erased DMT symbols and attempting to identify the largest number of consecutively corrupted symbols that needs to be corrected. In other embodiments, the receiver detects the number of erased (severely corrupted symbols) during a consecutive predefined time intervals, associated with the FEC codeword span. In another embodiment, transceiver 108 or 110 evaluates the FEC decoding itself to determine the number of bytes that needs to be corrected in some or all code words and whether the number of corrupted bytes exceeds the number of correctable bytes.

The management systems 116, 118 may work in conjunction with the analyzers 122, 124 to collect the monitored data and apply various thresholds to determine an updated INP value (e.g., the number of severely corrupted DMT symbols in consecutive time spans). The monitoring process can collect statistics over the number of symbols that have been corrupted during a sequence of I symbols. The management systems may evaluate the statistics to provide an updated INP value, expressed in number of symbols that can be protected per I bytes.

At 512 a determination is made whether the updated INP value is greater than the current INP value. If the updated INP value is greater than the initial INP value (YES at 512), then in step 514 the system may determine whether the updated INP value is greater than the maximum INP for which the FEC and IL parameters were initially optimized. If so (YES at 514), the method proceeds to 516 where the system can increase the maximum INP, which may require a change of parameter I and interleaver parameters. Because the system will likely be reconfigured with the new parameters (e.g., I and D), the system may need to undergo re-initialization, because changing I during data transfer may be complex.

If the updated INP value is not greater than the maximum INP (NO at 514), then the method proceeds to 518 wherein the system may decide to selectively increase the impulse noise protection by adjusting the FEC and IL parameters based on the updated INP value. For example, the initiating modem could increase R to increase INP. This decision could be made by either operator (manually) or by the management system 116. As the management system 116 receives the updated INP value over management communication channels, the management system computes a new set (updated set) of the FEC and IL parameters.

There are various ways in which the FEC and IL parameters can be adjusted to increase the impulse noise protection. In one embodiment, codeword bytes are equally distributed over DMT symbols and, thus, the FEC and IL parameters can be adjusted to increase the minimum number of redundant bytes per codeword (R) and reducing the number of interleaver blocks per codeword (Q). In one embodiment, the FEC and IL parameters can be set during initialization in a way such that, when changes in impulse noise protection are required in data transfer, only the value of tB needs to be adjusted while the values of I and D are kept constant, and while L is kept constant to avoid unnecessary changes in bit rate. The impulse noise protection could also be increased in other ways.

As the new settings of FEC and IL parameters are obtained, the management system of the initiating modem starts the process of reconfiguring the FEC encoders and interleavers in 520-524.

In step 520, the initiating modem communicates a new message that includes the modified FEC and IL parameters to the responding modem over the management channel. As the responding modem receives the new parameters, it acknowledges the message by ending either an "unable to comply" message, if its resources are insufficient for new settings, or a time marker indicating the exact position within the interleaved data stream (e.g. exact FEC codeword) when the reconfiguration is to be initiated.

In step 522, both the initiating side and the responding side simultaneously and seamlessly re-configure their FEC and IL parameters, for example, by starting from the first bytes of the first FEC codeword following the time marker, or any other predefined number of FEC codewords following the time marker. The time marker can identify an FEC code word directly or by marking the symbol this codeword is related. After the reconfiguration is accomplished, the system returns to 508 where it continues the monitoring process using new-assigned thresholds and time interval values based on the adjusted FEC and IL parameters.

Referring back to numeral 512, if the updated INP value is not greater than the initial INP value (NO at 512), then the system determines if the impulse noise protection can be safely reduced at 526. If the impulse noise protection cannot be safely reduced (NO at 526), then the FEC and IL parameters are sufficient and cannot be improved for efficiency in 528. Thus, the method returns to 508 where the impulse noise on the line is monitored and analyzed.

If the impulse noise protection can be safely reduced (YES at 526), then the system may decide to selectively improve the efficiency (e.g., by decreasing the impulse noise protection by adjusting the FEC and IL parameters). This decision could be made by either operator (manually) or by the management system 116.

There are various ways in which the FEC and IL parameters can be adjusted to increase the efficiency. In one embodiment, the efficiency could be increased by increasing the number of interleaver blocks per codeword (Q) and decreasing the minimum number of redundant bytes per codeword (R). The system could also increase the efficiency in other ways. After the system adjusts the FEC and IL parameters to increase the efficiency in step 526, the system undergoes the message exchange and implements the modified parameters as previously discussed in steps 520-524, after which impulse noise on the line is again monitored and characterized.

Figure 5B:
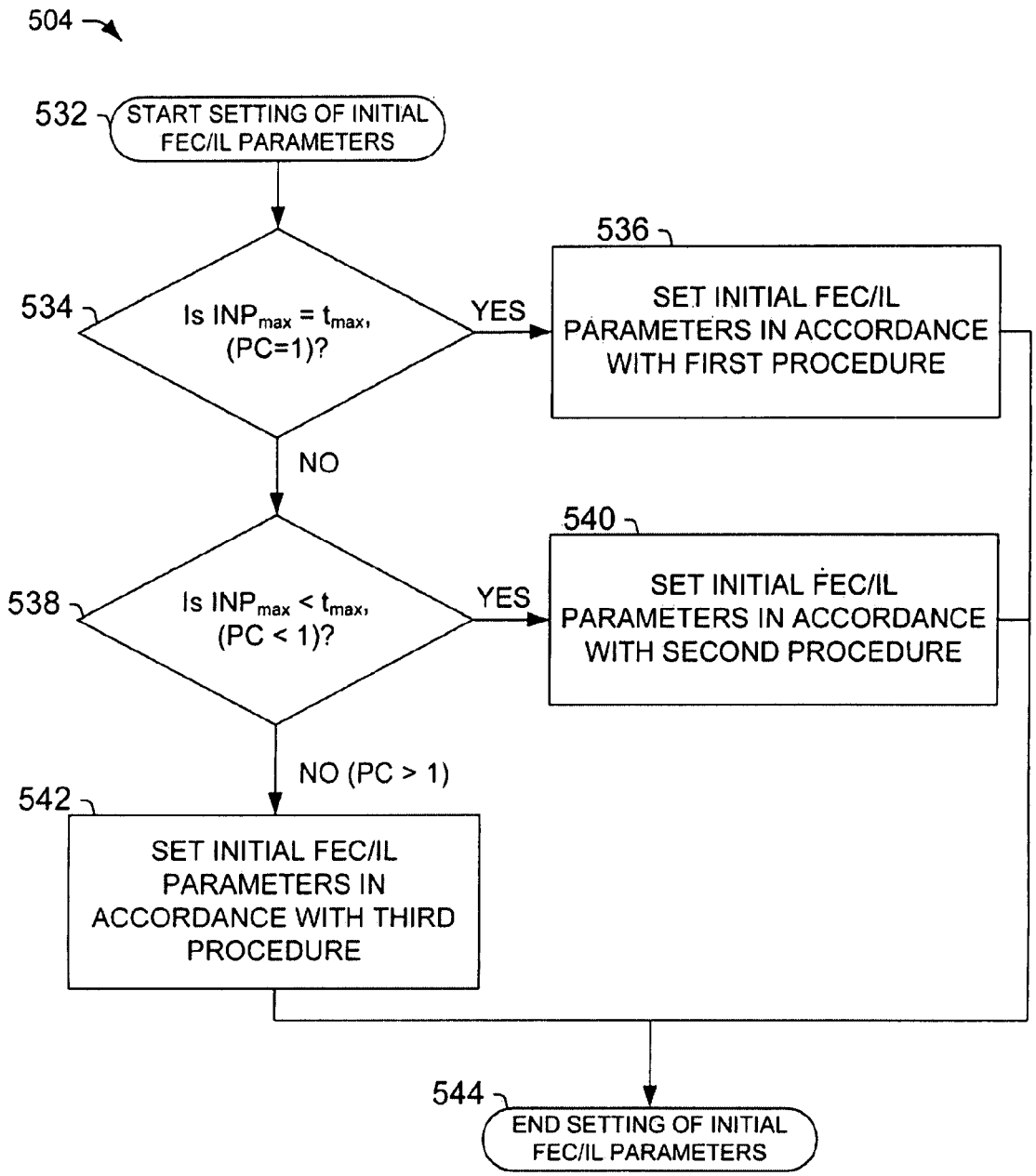

Referring now to FIG. 5B-5E, one embodiment of a more detailed method is shown for calculating the initial FEC parameters 504. In FIG. 5B's illustrated embodiment, the initial FEC and IL parameters can be calculated based on a value related a communication characteristic, such as a protection-to-correction ratio that relates to both the maximum value of the INP ($INP_{max}$) and the maximum number of correctable bytes per codeword ($t_{max}$), for example. Thus, if it is determined that $INP_{max}=t_{max}$, or that a protection to correction ratio (PC) is equal to 1 (YES at 534), then the initial FEC and IL parameters are set in accordance with a first procedure in 536. If it is determined that $INP_{max}<t_{max}$, or that PC is less than 1 (YES at 538), then the initial FEC and IL parameters are set in accordance with a second procedure in 540. Finally, if it is determined that $INP_{max}>t_{max}$, or PC is greater than 1 (NO at 538), then the initial FEC and IL parameters are set in accordance with a third procedure in 542.

Figure 5C:
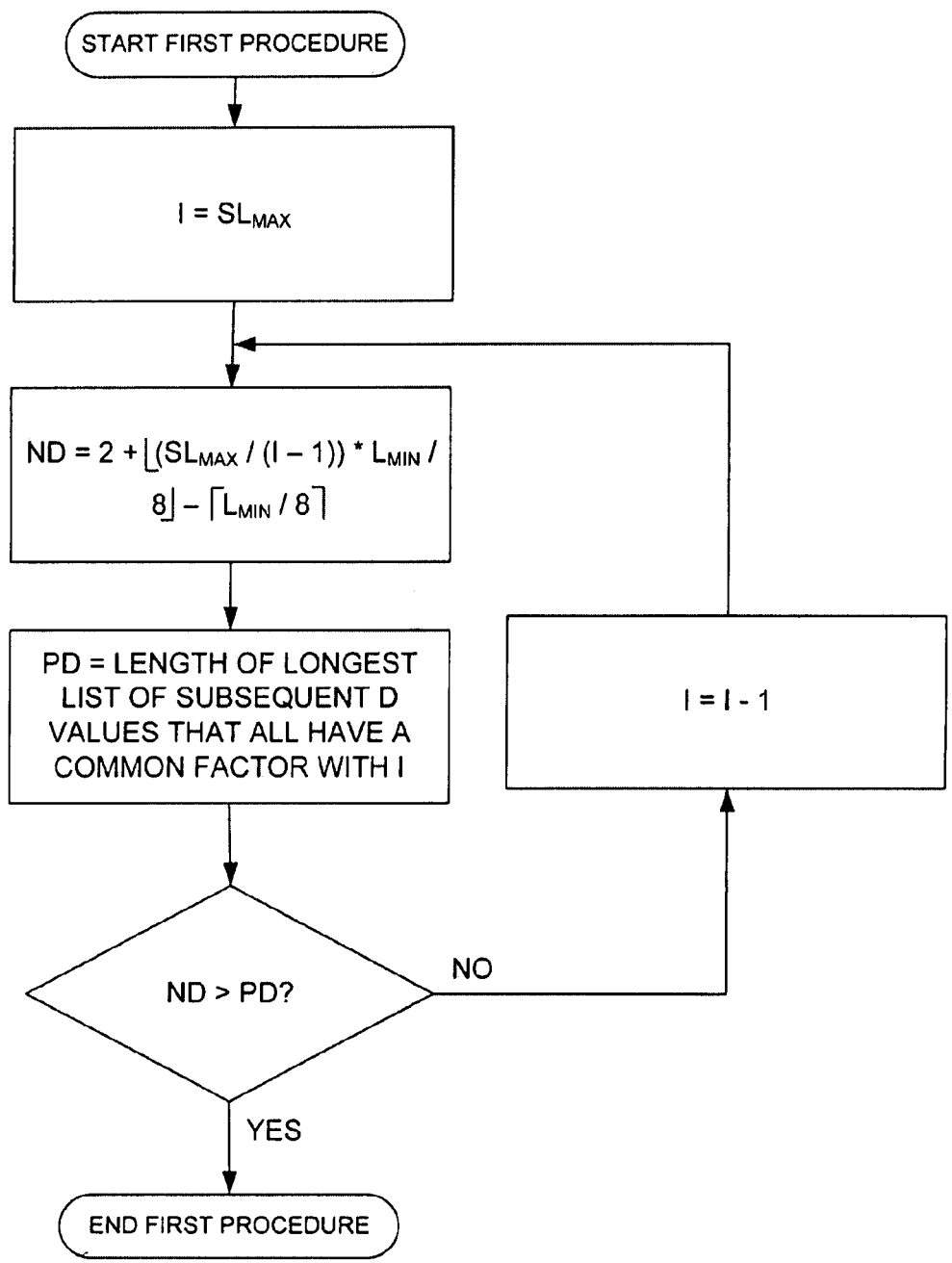

FIG. 5C shows one method 536 for determining the initial FEC parameters in accordance with the first procedure when $INP_{max}=t_{max}$, wherein PC=1 and each symbol within the span of an interleaver block carries exactly one byte. Thus, when impulse noise corrupts a symbol, only one byte of the interleaver block is likely to be corrupted. The result of the monitoring process over a long time should be to get a statistic over the number of symbols that have been corrupted during a sequence of I symbols. The evaluation of this statistic can give the number of symbols that can be protected per I bytes. Thus, the number of protected bytes could be in particular the highest observed number of corrupted bytes.

In this method, during initialization we set:

$$t_B = INP, \quad (34)$$

wherein INP is the current value for impulse noise protection. Notably, although this expression is set during initialization, it is retained during data transfer. Thus, the range of valid D values becomes independent from the INP parameter. D is limited by equations (15), (17) and (32) of Table 1 as:

$$L/8 \leq D \leq 1 + SL_{max} \times (L/8)/(I-1), \quad (35)$$

Thus, the number of different values of D given by (35) is:

$$ND = 2 + \lfloor (SL_{max}/(I-1)) \times L_{min}/8 \rfloor - \lceil L_{min}/8 \rceil, \quad (36)$$

where $SL_{max} = TL_{max}/Ts$ is derived from the maximum allowed interleaver delay, and $L_{min}$ is the minimum number of bits per symbol. The $TL_{max}$ (maximum latency allowed for the service deployed) and $L_{min}/Ts = lbr_{min}$ (minimum line bit rate required for the service deployed) are provided by the management system. The next step is to try $$I = \lceil SL_{max} \rceil, \quad (37)$$

It can be seen from (36) that this is the maximum value for I that generally results in one or more possible values for D.

Next the method determines the values of D that are co-prime with I. Depending on the prime factor(s) of I, there can be a list of subsequent values for D that are not co-prime with I. Since D is not yet known, ND has to be bigger than the number of elements in this list. Otherwise there can be cases where at a given $L_{min}$ no D exists that is co-prime with I. If that can not be established, one embodiment of this invention is to select a smaller value for I. A solution is for example to decrement the current value of I by 1. This time ND will be larger and the new value of I has other prime factors. If ND is still too small, and I has again to many common prime factors with D, the value of I can be decremented again and so forth.

For example, assume $lbr_{min}=3.2$ Mbit/s and $SL_{max}=30$ then we have $L_{min}=800$ and I=30. This results in ND=5. After activation the line bit rate results in a value L=910, for which equation (35) requires that D has to be between 114 and 118. But none of these possible values for D is co-prime with I=30. Therefore we have to set I=29 and now this fulfils all requirements.

In the procedure described with reference to FIG. 5C, when a smaller value for I is selected, it reduces the payload data rate to some extent. That is because the correction overhead per interleaver block for $t_B$ remains. Therefore instead of the procedure in FIG. 5C an alternative embodiment of this invention is not to change I after setting (37). The solution is to control the line bit rate and to reduce L in a way that the limits given by (35) allow D to get a value that is co-prime with 1. This however also reduces the payload datarate.

In other embodiments, FEC settings can be optimized to maximize the FEC codeword length N. This would make the system more robust. Such embodiments could use the maximum possible value of Q:

$$Q = \text{minimum}(\lfloor t_{max}/t_B \rfloor, \lfloor N_{max}/I \rfloor) \quad (38)$$

wherein $N_{max}$ is the maximum length of the FEC codeword allowed either by the implementation or by the type of forward error correction used. With that the code word still remains equally distributed over the symbols however here Q Bytes per codeword are transmitted per symbol.

Thus, the method in FIG. 5C and the alternative described above can find an optimal value for I simply from the service requirements and the modem capabilities. No knowledge of the actual line conditions is necessary. This procedure is to be used before or during the initialization, when initial (expected) requirements for impulse noise protection are known.

Thus, the procedure in FIG. 5C can be coordinated with data transfer during which the system can discover the actually required impulse noise protection, and thus the minimum amount of overhead for the correction redundancy can be selected. The system can be adapted only by changing $t_B$ and possibly q. The system is also able to use the dynamic change of interleaver depth to adapt to varying line rate by changing D proportional to L. As long as D is maintained in the range given by (35) the INP is preserved when lbr changes. No change of any other parameters is required.

Figure 5D:
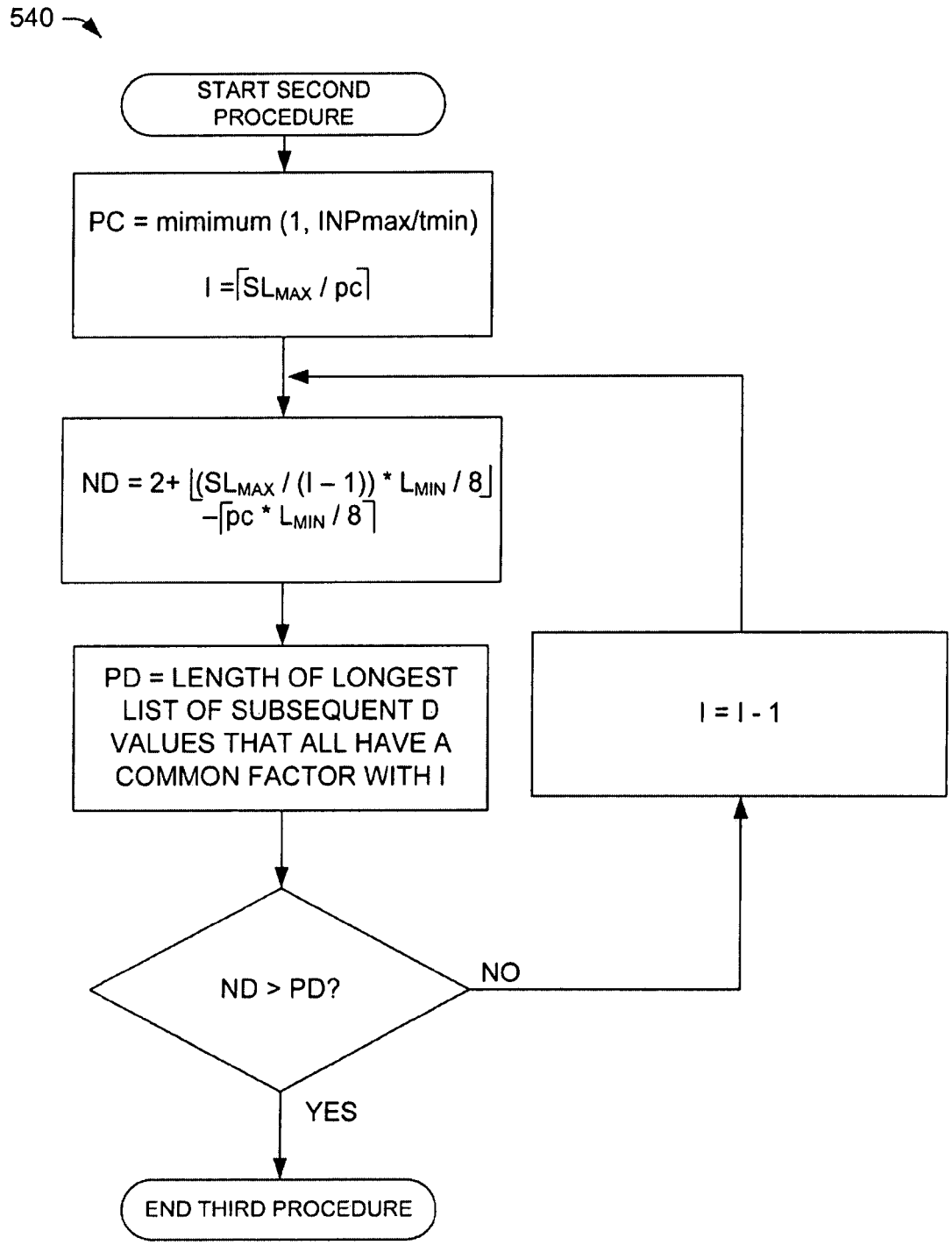

Referring now to FIG. 5D, another method 540 is shown in which we define the protection to correction ratio (pc) with:

$$pc = INP_{max}/t_{max} \quad (40)$$

It is a preferred solution that every value of $t_B$ fulfils the requirements for another value of the INP parameter and that the full range of $t_B$ up to $t_{max}$ can be used. This may not be achieved when pc<1. as may be the case in (40). However, the following discussion would also give consistent results.

We define the rule for $t_B$ in an actual noise scenario, instead of (34), to:

$$t_B = \lceil INP/pc \rceil, \quad (44)$$

where "pc" is a constant throughout the whole Showtime while INP and consequently $t_B$ would change according to the noise environment. The VDSL2 standard defines integer values of INP only up to 16. For VDSL2 pc can only be less or equal 2 inclusive. For pc>1 the (35) to (37) have to be changed accordingly:
To make D again independent from the current $t_B$ (35) converts into:

$$pc \times L/8 \leq D \leq 1 + SL_{max} \times (L/8)/(I-1), \quad (45)$$

The minimum number of possible values of D is then instead of (36):

$$ND = 2 + \lfloor (SL_{max}/(I-1)) \times L_{min}/8 \rfloor - \lceil pc \times L_{min}/8 \rceil, \quad (46)$$

Now we try $I = \lceil SL_{max}/pc \rceil$ (47) instead of (37).
The remainder of the procedure is identical as described previously. FIG. 5D displays a procedure for one general case.
Instead of the method given in FIG. 5D it is also possible to stop after equation (47).

Figure 5E:
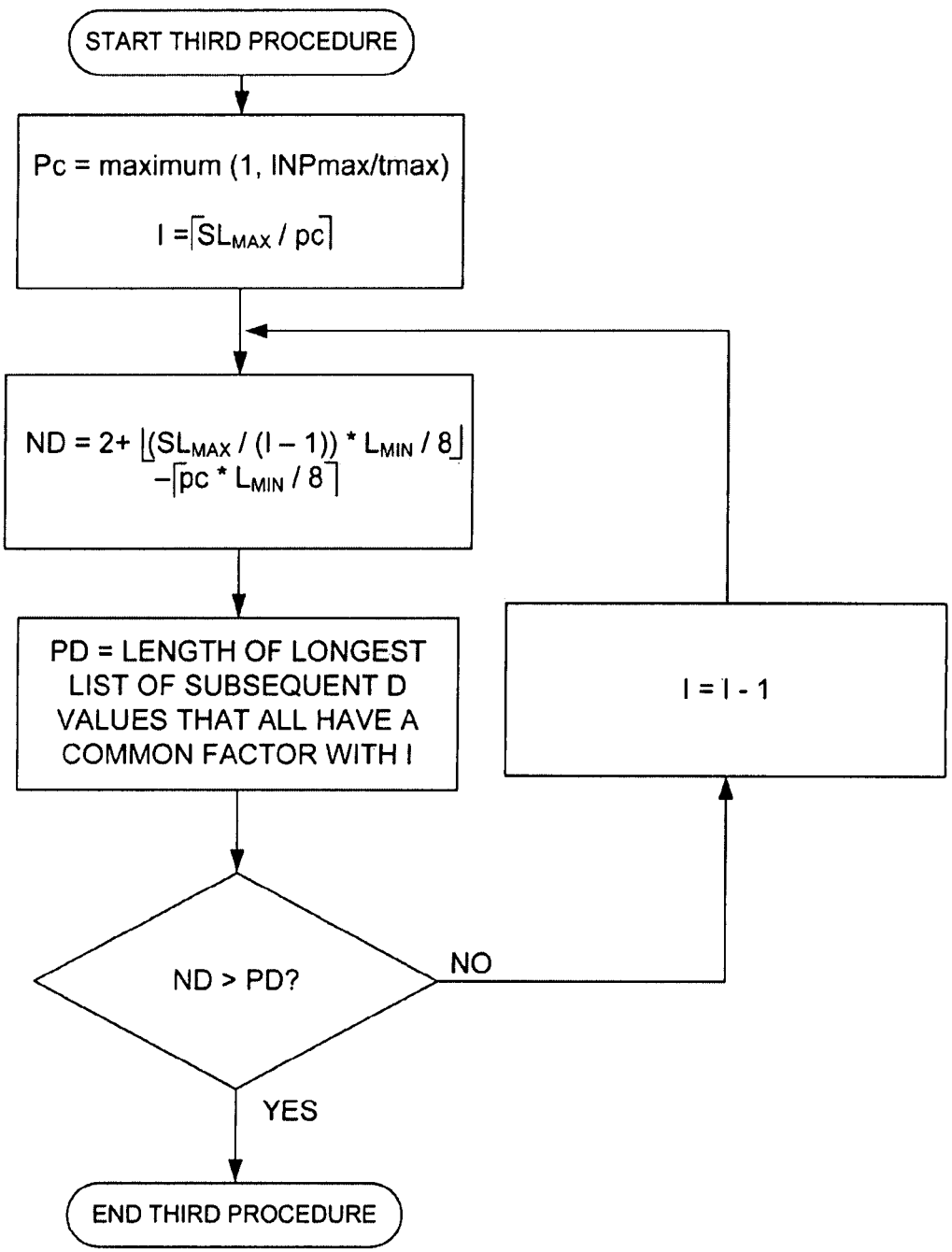

Referring now to FIG. 5E, one embodiment 542 is shown for determining the initial FEC and IL parameters when PC>1. This embodiment is similar to the embodiment discussed when PC=1 (e.g., FIG. 5C) however, the embodiment when PC=1 does not use the full correction redundancy that is available ($t \leq INP_{max}$). When PC>1, the length of the codewords becomes shorter than it could be, and a higher number of codewords can be decoded per symbol. In some cases this exceeds the computation power of the system. Thus, in PC>1, we define $$pc = INP_{max}/t_m < 1 \quad (50)$$

Where $t_m$ is the minimum number of correctable bytes that are needed to protect $INP_{max}$ symbols with a codeword length that is high enough that doesn't exceed the decoding capabilities of the system.
We define the rule for $t_B$ in an actual noise scenario, instead of (34), to:

$$t_B = \lceil INP/pc \rceil, \quad (54)$$

Again "pc" is a constant throughout the whole Showtime while INP and consequently $t_B$ would change according to the noise environment. The VDSL2 standard defines integer values of INP only up to 16. For VDSL2 pc can only be between 1 and 2 inclusive. For pc>1 the (35) to (37) have to be changed accordingly:
To make D again independent from the current $t_B$ (35) converts into:

$$pc \times L/8 \leq D \leq 1 + SL_{max} \times (L/8)/(I-1) \quad (55)$$

The minimum number of possible values of D is then instead of (36):

$$ND = 2 + \lfloor (SL_{max}/(I-1)) \times L_{min}/8 \rfloor - \lceil pc \times L_{min}/8 \rceil \quad (56)$$

Now we try $I = \lceil SL_{max}/pc \rceil$ instead of (37). (57)
The remainder of the procedure is identical as described previously. FIG. 5E displays one procedure of a general case.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of selectively modifying impulse noise protection in a communication system, comprising:
    adding a number of redundancy bits to blocks of data to form codewords, where the number of redundancy bits is capable of correcting up to a pre-determined number of bit errors within each block of data, and where the number of redundancy bits is selected as a function of an initial impulse noise protection value;
    separating the codewords into interleaver blocks and interleaving the interleaver blocks to form an interleaved data stream; and
    selecting an interleaver depth such that one symbol corresponds to an integer number of bytes of the interleaved data stream.

2. The method of claim 1, where a number of redundancy bytes per interleaver block is selected to be equal to a value of impulse noise protection per symbol.

3. The method of claim 1, where a number of bytes per interleaver block is selected to be identical to a maximum interleaver delay per symbol.

4. The method of claim 1, further comprising:
    seamlessly adjusting impulse noise protection from the initial impulse noise protection value to a modified impulse noise protection value.

5. The method of claim 4, where seamlessly adjusting impulse noise protection comprises:
    selectively adapting only the number of redundancy bits.

6. The method of claim 4, where seamlessly adjusting impulse noise protection comprises:
    altering an effective number of correctable bytes per interleaver block.

7. The method of claim 4, where seamlessly adjusting impulse noise protection comprises:
    altering a number of correctable bytes per codeword.

8. The method of claim 4, where seamlessly adjusting impulse noise protection comprises:
    altering the integer number of bytes of the interleaver block.

9. The method of claim 1, where the impulse noise protection value is selected as a function of a ratio between a maximum impulse noise protection value and a maximum number of correctible bytes per codeword.

10. A communication device configured to transfer a block of data over a communication line, comprising:
    a forward error correction encoder configured to form a codeword by adding a number of redundancy bits to the block of data; and
    an interleaver configured to form an interleaved data stream by dividing the codeword into a plurality of interleaver blocks and interleaving the interleaver blocks;
    wherein the communication device is configured to frame the interleaved data stream as a series of symbols over the communication line, wherein one symbol is framed to correspond to an integer number of bytes of one of the plurality of interleaver blocks.

11. The communication device of claim 10, further comprising:
    an analyzer configured to monitor the interleaved data stream during communication service and to determine a number of corrupted symbols within a codeword span associated with the codeword.

12. The communication device of claim 11, wherein the communication device is configured to selectively adapt an impulse noise protection value as a function of the number of corrupted symbols.

13. The communication device of claim 12, wherein selectively adapting the impulse noise protection value comprises altering the number of redundancy bits.

14. The communication device of claim 12, wherein while the impulse noise protection value is selectively adapted, at least one of an interleaver block size, an interleaver depth, and a number of bits loaded per symbol remain constant.

15. The communication device of claim 10, where the communication device is a DSL modem.

16. A communication device comprising:
    an analyzer for monitoring impulse noise on a transmission line during communication service;
    a signal processor for forming codewords having redundancy bits and for interleaving the codewords to form an interleaved data stream;
    wherein the signal processor is adapted to adjust impulse noise protection by changing only the number of redundancy bits associated with codewords; and
    wherein the signal processor is adapted to selectively distribute an integer number of bytes of a codeword over one symbol; wherein a byte boundary of the codeword is aligned to a boundary of the symbol, or
    wherein the signal processor is adapted to selectively distribute an integer number of bytes of an interleaver block over one symbol; wherein a byte boundary of the interleaver block is aligned to a boundary of the symbol.

* * * * *